(12) United States Patent
Furukawa et al.

(10) Patent No.: US 6,594,637 B1
(45) Date of Patent: Jul. 15, 2003

(54) SCHEDULE MANAGEMENT SYSTEM AND METHOD

(75) Inventors: Tohru Furukawa, Hadano (JP); Michikazu Hirota, Machida (JP); Kenichi Nagashima, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/395,323

(22) Filed: Sep. 13, 1999

(30) Foreign Application Priority Data

Sep. 14, 1998 (JP) ............................................. 10-260417

(51) Int. Cl.⁷ .............................................. G06F 17/60
(52) U.S. Cl. ..................... 705/9; 705/7; 705/8; 345/751
(58) Field of Search ....................... 705/9, 8, 7; 345/751

(56) References Cited

U.S. PATENT DOCUMENTS

| | | | | |
|---|---|---|---|---|
| 5,124,912 A | * | 6/1992 | Hotaling et al. | 40/107 |
| 5,317,699 A | * | 5/1994 | Sugita et al. | 395/325 |
| 5,692,125 A | * | 11/1997 | Schloss et al. | 395/209 |
| 5,701,423 A | * | 12/1997 | Crozier | 345/762 |
| 5,848,395 A | * | 12/1998 | Edgar et al. | 705/9 |
| 5,911,134 A | * | 6/1999 | Castonguay et al. | 705/9 |
| 6,016,478 A | * | 1/2000 | Zhang et al. | 705/8 |

FOREIGN PATENT DOCUMENTS

WO     WO 98/48561    * 10/1998 ........... G06F/17/60

OTHER PUBLICATIONS

Marshall, Thomas et al. "Contact management software: It's not what you know," InfoWorld, v16n52,1. Jan. 2, 1995.*
Marshall, Patrick. "Two outline–oriented PIMs go head to head," InfoWorld, v16n28. Jul. 11, 1994.*
Marshall, Patrick. "On Time for Windows: A Super Scheduler," InfoWorld, v13. Oct. 7, 1991.*
Hoffman, Paul. "My calendar will call your calendar," Network World, v14. Mar. 10, 1997.*
Tessler, Franklin N. "Software secretaries," Macworld, v10. Feb. 1993.*

* cited by examiner

Primary Examiner—Tariq R. Hafiz
Assistant Examiner—Catherine Michelle Colón
(74) Attorney, Agent, or Firm—Louis J. Percello; F. Chau & Associates, LLP

(57) ABSTRACT

When a regularly and periodically occurring schedule is inputted along with a period and condition of occurrence for a plurality of arbitrary users, a schedule of a corresponding date is automatically generated for the plurality of users. A common routine schedule number is correlated to the generated schedules and a common sum schedule number is associated to each date. The schedules thus registered can be corrected/deleted individually and in a group.

18 Claims, 14 Drawing Sheets

*240* Sum Schedule Management Table

| Sum Schedule Number | Routine Number |
|---|---|
| 0001 | 00000001 |
| ⋮ | ⋮ |

*251* Holiday Management Table *255* *257*

| National Holiday Y/M/D | National Holiday Name | Company Holiday Y/M/D | Company Holiday Name |
|---|---|---|---|
| 01/01<br>01/15<br>02/11<br>1998/03/21 | New Year<br>Adult Day<br>Founding Day<br>Equinox | 0998/01/12 | Founding Day |
| ⋮ | ⋮ | ⋮ | ⋮ |

*261* Routine Management Table *263*

| Routine Number | User Name (User ID) |
|---|---|
| 00000001 | Tara Yamada (Taro Yamada/IBM), Hanako Suzuki (HanakoSuzuki/IBM), Jiro Tanaka (Jiro Tanaka/IBM) |
| ⋮ | ⋮ |

FIG. 7

Routine Management Data : 00000001

| User | 1/7 ......... | 1/14........ | 1/21....... | 1/28....... | 2/4 ...... |
|---|---|---|---|---|---|
| Taro Yamada | ▨ | ▨ | ▨ | ▨ | ▨ |
| Hanako Suzuki | ▨ | ▨ | ▨ | ▨ | ▨ |
| Hajime Sato | ▨ | ▨ | ▨ | ▨ | ▨ |

Sum Management Data 0001 (Sum No.) | Sum Management Data 0002 (Sum No.) | Sum Management Data 0003 (Sum No.) | Sum Management Data 0004 (Sum No.) | Sum Management Data 0005 (Sum No.)

| User | 1/7 | 1/14 | 1/21 |
|---|---|---|---|
| Taro Yamada | Routine No.:00000001<br>Sum No.     :0001 | Routine No.:00000001<br>Sum No.     :0002 | Routine No.:00000001<br>Sum No.     :0003 |
| Hanako Suzuki | Routine No.:00000001<br>Sum No.     :0001 | Routine No.:00000001<br>Sum No.     :0002 | Routine No.:00000001<br>Sum No.     :0003 |
| Hajime Sato | Routine No.:00000001<br>Sum No.     :0001 | Routine No.:00000001<br>Sum No.     :0002 | Routine No.:00000001<br>Sum No.     :0003 |

FIG. 16

Schedule Data

| User | Schedule Information | Routine No. | Sum No. |
|---|---|---|---|
| Taro Yamada | 1/21 10 ~ 12 Routine Meeting | 00000001 | 0003 |
| Hanako Suzuki | 1/21 10 ~ 12 Routine Meeting | 00000001 | 0003 |
| Hajime Sato | 1/21 10 ~ 12 Routine Meeting | 00000001 | 0003 |
| Taro Yamada | 1/28 10 ~ 12 Routine Meeting | 00000001 | 0004 |
| Hanako Suzuki | 1/28 10 ~ 12 Routine Meeting | 00000001 | 0004 |

Same Routine/Sum Nos.
← Delete/Change
Delete/Change at Same Time

FIG. 17

SCHEDULE MANAGEMENT SYSTEM AND METHOD

BACKGROUND OF THE INVENTION

1. Technical Field

This invention relates to a schedule management system and, more particularly, to a system which allows a plurality of users to efficiently register and manage a routine schedule occurring in a substantially constant condition.

2. Discussion of Related Art

A typical schedule management system is a computer-based device for inputting a repetitive or periodical schedule, such as "Meeting from 10:00 to 11:00 every day for 10 days from today" and "Morning meeting from 9:00 on every Monday".

However, irregular factors including a partial change/deletion such as "Meeting starts at 2:00 only today" and "Morning meeting is canceled in this week" are often brought in a periodically occurring schedule (hereinafter referred to as a routine schedule) of this kind. Also, it may be desired to delete a registered schedule in a bundle or change the content thereof as a result of a review of a project.

In a conventional schedule management system, it was difficult to input such irregularity when the schedule was generated in the manner similar to a schedule in which a routine schedule was normally registered, usually according to a pattern in which a routine pattern was pre-registered. Removal of an irregular schedule from an object to be managed as a routine schedule or manage after input (delete or change the routine schedule in a bundle) is difficult. For example, the conventional system was cannot register a partial change of a pattern such as "Morning meeting starts at 10:00 in this month only".

Further, when it was desired to change a routine pattern of a specific period, for example, to change a schedule which was initially registered for every Monday for one year from January 1 to every Tuesday from April to December, a later change encompassing periods of two patterns (every Wednesday from February to May, for example) could not be effected at one time so that the schedule had to be changed for each period (from February to March and from April to May) because the schedule was managed separately for each period (from January to March and from April to December). This invited a cumbersome operation.

Such routine schedule is, in many cases, common to a plurality of members of an organization unit and registered as a long term routine schedule. However, such schedule of an organization unit may be subject to a change. In this case, the change is often not limited to an individual and may be applicable to other persons (change of the day of the week of a periodical meeting, for example). The conventional schedule management apparatus was very inefficient because the schedule had to be changed individually though the change was common.

SUMMARY OF THE INVENTION

It is an object of this invention to provide a schedule management system of an improved operability in which a change or a deletion by one person can be reflected to a group of persons who share a same routine schedule.

It is another object of this invention to provide a schedule management system of an improved work efficiency with a reduced occurrence of an input error by managing a schedule management work in a bundle rather than individually as done conventionally.

It is a further object of this invention to provide a schedule management system of an improved operability which flexibly cope with a routine schedule in which an exceptional change occurs.

It is a further object of this invention to provide a schedule management system which allows a routine schedule and a normal schedule to be grasped at the same time while intuitively recognizing the distinction therebetween.

It is a further object of this invention to provide a schedule management system in which resources required upon execution are reduced.

By inputting a regularly and periodically occurring schedule for a plurality of arbitrary users together with a period of occurrence and a condition of occurrence, a schedule of a corresponding day is automatically generated for the plurality of users. All the generated schedules are associated with a common routine schedule number and a common sum schedule number for each day. The schedules registered in this manner can be changed and deleted individually and in a bundle.

This invention provides, in one aspect thereof, a method of displaying a schedule of at least a part of a plurality of users on a schedule management apparatus which is provided with a display screen and an input device for managing individual schedule information which is registered for each of the plurality of users, said method comprising the steps of;

(a) specifying a plurality of users and detecting an operation instructing a schedule sum, (b) obtaining user identification information which uniquely identifies each of said specified plurality of users, (c) displaying a sum schedule input area for inputting a schedule common to said specified plurality of users on said display screen in response to said operation, (d) receiving a user input including a schedule starting time, a schedule ending time and a condition of the date a schedule is set in said sum schedule input area, (e) generating schedule data including the schedule starting time and the schedule ending time for said specified plurality of users for each of a plurality of set dates corresponding to said condition of the date a schedule is set, (f) generating a routine schedule number corresponding to the schedule information inputted in said sum schedule input area, (g) generating a sum schedule number corresponding to the schedule information inputted in said sum schedule input area for each of said plurality of set dates, (h) correlating user schedule data of said specified plurality of users to said routine schedule number and registering said user schedule data in correlation to the set date and said sum schedule number, and (i) displaying the schedule of at least a part of said specified plurality of users based on the user schedule data of said at least a part of users.

Incidentally, the term "sum schedule input area" as used in the claims of this specification is a concept including a schedule input panel and a sum schedule line to be described later.

This invention provides, in another aspect thereof, a method of changing schedule data on a schedule management apparatus which is provided with a display screen and an input device, said method comprising the steps of;

(a) displaying a plurality of user schedule information items including information of a schedule starting time and a schedule ending time, (b) detecting that one of said plurality of user schedule information items is specified, (c) obtaining information of a changed period and a changed content inputted by an operator, (d) determining whether or not a routine number and a sum number are associated with the user schedule data of said changed period, and (e) reregistering the routine number and the sum number associated with said one of the user schedule information item, and user schedule data associated with a common routine number and a common sum number according to the changed content when it is determined that a routine number and a sum number are associated with the user schedule data of said changed period.

This invention provides, in a further aspect thereof, a schedule management system which is provided with a display screen and an input device and manages individual schedule information which are registered for each of the plurality of users, said system comprising;

(a) an event detecting part for specifying a plurality of users and detecting an operation instructing a schedule sum, (b) a sum schedule input area for inputting a schedule common to said specified plurality of users on said display screen, (c) a routine schedule data generating part, responsive to a schedule starting time, a schedule ending time and a condition of the date a schedule is set inputted, for generating schedule data including the schedule starting time and the schedule ending time for said specified plurality of users for each of a plurality of set dates corresponding to said condition of the date a schedule is set in said sum schedule input area, (d) a routine schedule number generating part for generating a routine schedule number corresponding to schedule information inputted in said sum schedule input area, (e) a sum schedule number generating part for generating a sum schedule number corresponding to the schedule information inputted in said sum schedule input area and allocated to each of said plurality of set dates, and (f) a user schedule management table for correlating user schedule data of said specified plurality of users to said routine schedule number and registering said user schedule data in correlation to the set dates and said sum schedule number.

This invention provides, in a further aspect thereof, a schedule management system which is provided with a display screen and an input device, said system comprising;

(a) a display device for displaying a plurality of user schedule information items including a schedule starting time and a schedule ending time, (b) an event detecting part for detecting that one of said plurality of user schedule information items is specified, (c) a schedule data input panel for obtaining information of a changed period and a changed content, and (d) a control part for reregistering the routine number and the sum number associated with said one of the user schedule information item, and user schedule data associated with a common routine number and a common sum number according to the changed content when a routine number and a sum number are associated with the user schedule data of said changed period.

This invention provides, in a further aspect thereof, a storage medium storing a schedule management program for displaying a schedule of at least a part of a plurality of users on a schedule management apparatus which is provided with a display screen and an input device and manages individual schedule information which is registered for each of the plurality of users, said schedule management program comprising;

(a) a program code for instructing said schedule management apparatus to specify a plurality of users and detect an operation instructing a schedule sum, (b) a program code for instructing said schedule management apparatus to obtain user identification information which uniquely identifies each of said specified plurality of users, (c) a program code for instructing said schedule management apparatus to display a sum schedule input area for inputting a schedule common to said specified plurality of users on said display screen in response to said operation, (d) a program code for instructing said schedule management apparatus to receive a user input including a schedule starting time, a schedule ending time and a condition of the date a schedule is set in said sum schedule input area, (e) a program code for instructing said schedule management apparatus to generate schedule data including the schedule starting time and the schedule ending time for said specified plurality of users for each of a plurality of set dates corresponding to said condition of the date a schedule is set, (f) a program code for instructing said schedule management apparatus to generate a routine schedule number corresponding to the schedule information inputted in said sum schedule input area, (g) a program code for instructing said schedule management apparatus to generate a sum schedule number corresponding to the schedule information inputted in said sum schedule input area for each of said plurality of set dates, (h) a program code for instructing said schedule management apparatus to correlate user schedule data of said specified plurality of users to said routine schedule number and registering said user schedule data in correlation to the set date and said sum schedule number, and (i) a program code for instructing said schedule management apparatus to display the schedule of at least a part of said specified plurality of users based on the user schedule data of said at least a part of users.

This invention provides, in a further aspect thereof, a storage medium storing a schedule management program for changing schedule data on a schedule management apparatus which is provided with a display screen and an input device, said schedule management program comprising;

(a) a program code for instructing said schedule management apparatus to display a plurality of user schedule information items including information of a schedule starting time and a schedule ending time, (b) a program code for instructing said schedule management apparatus to detect that one of said plurality of user schedule information items is specified, (c) a program code for instructing said schedule management apparatus to obtain information of a changed period and a changed content inputted by an operator, (d) a program code for instructing said schedule management apparatus to determine whether or not a routine number and a sum number are associated with the user schedule data of said changed period, and (e) a program code for instructing said schedule management apparatus to reregister the routine number and the sum number associated with said one of the user schedule information item, and user schedule data associated with a common routine number and a common sum number according to the changed content when it is determined that a routine number and a sum number are associated with the user schedule data of said changed period.

BRIEF DESCRIPTION OF THE DRAWINGS

FIG. 5 is a schematic chart of the sum schedule management table in the preferred embodiment of this invention.

FIG. 6 is a schematic chart of the holiday management table in the preferred embodiment of this invention.

FIG. 7 is a schematic chart of the routine management table in the preferred embodiment of this invention.

FIG. 16 is a schematic chart of the user schedule data table in inputting a group routine schedule in the preferred embodiment of this invention.

FIG. 17 is a schematic chart of the user schedule data table in changing/deleting a group routine schedule in the preferred embodiment of this invention.

DETAILED DESCRIPTION OF PREFERRED EMBODIMENTS

In the present disclosure and description, the term "schedule sum" is used to refer to a requested a sub-group event, where a sub-group refers to a subset of users. The term "routine schedule" is used to refer to a scheduled sub-group event that is scheduled to occur more than once, and the term "sum schedule" is used to refer to all scheduled events, including normal single occurrence events as well as recurring sub-group events.

Figure 1:
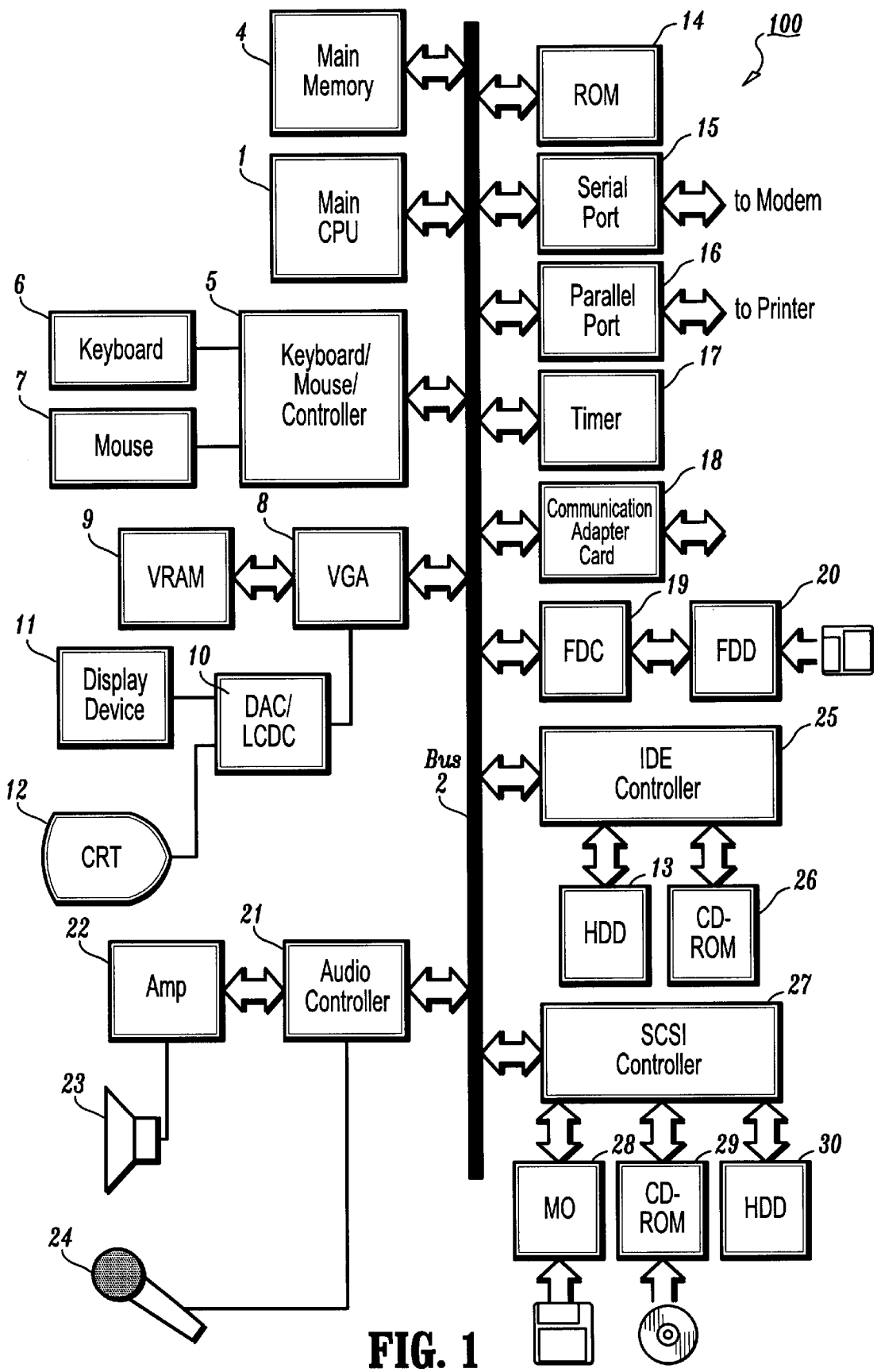
FIG. 1 is a block diagram showing a hardware configuration.

FIG. 1 shows a schematic diagram of a hardware configuration implementing the schedule management apparatus of this invention. The schedule management apparatus 100 comprises a central processing unit (CPU) 1 and a memory 4. The CPU 1 and the memory 4 are connected to a hard disk devices 13 as an auxiliary storage via a bus 2. A floppy disk device 20 (or recording medium drives 26, 28, 29, 30 such as an MO 28 and CD-ROM 26, 29) is connected to the bus 2 through a floppy disk controller 19 (or controllers such as an IDE controller 25, a SCSI controller 27).

A floppy disk (or recording medium such as an MO and CD-ROM) is inserted to the floppy disk device 20 (or recording medium drives 26, 28, 29, 30 such as an MO and CD-ROM). A computer program code which gives instructions to the CPU and the like in cooperation with an operating system to practice this invention is recorded in the floppy disk, the hard disk device 13, and a ROM 14 and executed by being loaded in the memory 4. The computer program code may be compressed or divided into pieces for recording in a plurality of media.

Further, the schedule management apparatus 100 may be a system which is provided with a user interface hardware including a pointing device 7 for inputting screen position information (a mouse, a joystick, track ball, etc.) or a keyboard 6 supporting a key input, and a displays 11, 12 for presenting image data to the user. A speaker 23 receives an audio signal from an audio controller 21 via an amplifier 22 for output as a voice.

The schedule management apparatus 100 can communicate with other computer via a serial port 15 and a modem or a communication adapter 18 such as a token ring.

As such, it will be readily understood that this invention may be implemented by a conventional personal computer (PC), a workstation, a portable information terminal, a computer which is incorporated in various home electric appliances such as a television and a facsimile, or a combination thereof. It should be noted, however, that these components are given for exemplary purpose and it is not meant that all of these components are the indispensable components of this invention. Because this invention is directed to management of a schedule, components such as the serial port 15, the communication adapter card 18, the audio controller 21, the amplifier 22 and the speaker 23 are not necessary.

While the operating system may desirably include an operating system which supports a GUI multi-windows environment as a standard such as Windows (a trademark of Microsoft Corporation), OS/2 (a trademark of International Business Machines Corporation), X-WINDOW System (a trademark of MIT) on AIX (a trademark of International Business Machines Corporation), the operating system is not limited to any specific operating system environment.

DESCRIPTION OF REFERENCE NUMBERS

100: Schedule management apparatus
101: Input part
103: Event detecting part
104: Sum schedule number generating part
105: Control part
106: Table input/output part
107: Display control part 108: Local data storage part
109: Display part
111: Schedule display window generating part
112: routine schedule data generating part
113: Sum schedule line generating part
115: routine schedule number generating part
117: Schedule data input panel generating part
120: Server α
130: Server β
210: User management master table
220: User schedule data table
240: Sum schedule management table
250: Holiday management table
260: routine management table While FIG. 1 shows a system in a stand alone environment, this invention may be implemented in the form of a client/server system in which a client machine is LAN connected to a server machine by Ethernet or a token ring, etc., and the server machine side may be provided with a control part and various management tables to be described later while the rest of functions are disposed in the client machine side. As such, it is a matter of choice in designing to dispose what functions in the server side and the client side, and various modifications including a combination of a plurality of machines and distribution of functions to them for practicing this invention is a concept included in the spirit of this invention.

The system configuration of this invention is now described with reference to the block diagram of FIG. 2. In the preferred embodiment of this invention, the schedule management system comprises an input part 101, an event detecting part 103, a sum schedule number generating part 104, a routine schedule number generating part 115, a control part 105, a table input/output part 106, a display control part 107, local data storage part 108, a display part 109, a schedule display window generating part 111, a routine schedule data generating part 112, a sum schedule line generating part 113, a schedule data input panel generating part 117, user schedule management tables 121, 131, sum schedule management tables 123, 133, holiday management tables 127, 137, routine management tables 124, 134, and user management master tables 125, 135.

The input part 101 obtains a signal from a pointing device such as a mouse and converts it to event information. In the preferred embodiment of this invention, a device driver and an operating system bear this function. The event detecting part 103 interprets the content of an inputted event to determine the kind of the event.

The control part 105 controls the schedule display window generating part 111 and the routine schedule number generating part 115, etc. The routine schedule number generating part 115 generates a routine schedule number which is uniquely identifiable within the system for each routine schedule. The routine number is allocated in a registered unit, that is, a unit in which schedule contents (monthly meeting, morning meeting, periodical business trip, etc.) are same (a same number for the entire period). This number allows routine schedules which are desired to be managed in a bundle to be distinguished.

The table input/output part 106 accesses to various tables located locally and remotely to obtain and write a content from and in the tables. The schedule data input panel generating part 117 generates an input panel for inputting a routine schedule. The sum schedule number generating part 104 generates a sum schedule number which is a uniquely identifiable number in the system. This number is used to determine a schedule corresponding to a person of a same routine group (same routine number) when an arbitrary schedule is selected.

The sum schedule line generating part 113 generates an area into which an operator inputs a sum schedule. The display control part 107 generates and changes display data. The display part 109 converts information received from the display control part 107 to image information and sends it to the display device. In the preferred embodiment of this invention, a device driver and an operating system bear this function.

The user management master tables 125, 135 are tables for managing the location of a server in which user's schedule information under the management of the schedule management system is resident. The user management master tables 125, 135 are tables which are registered in all servers existing in the schedule management system. In the preferred embodiment of this invention, the integrity of data in the user management master tables in each server is maintained by a replication (differential duplication) which is done among the servers. This technology is implemented by an RDB (relational database) on a server which is used for storing data. While many RDBs having such function are currently available, this invention is not limited to any mode of such technologies.

Figures 3, 4:
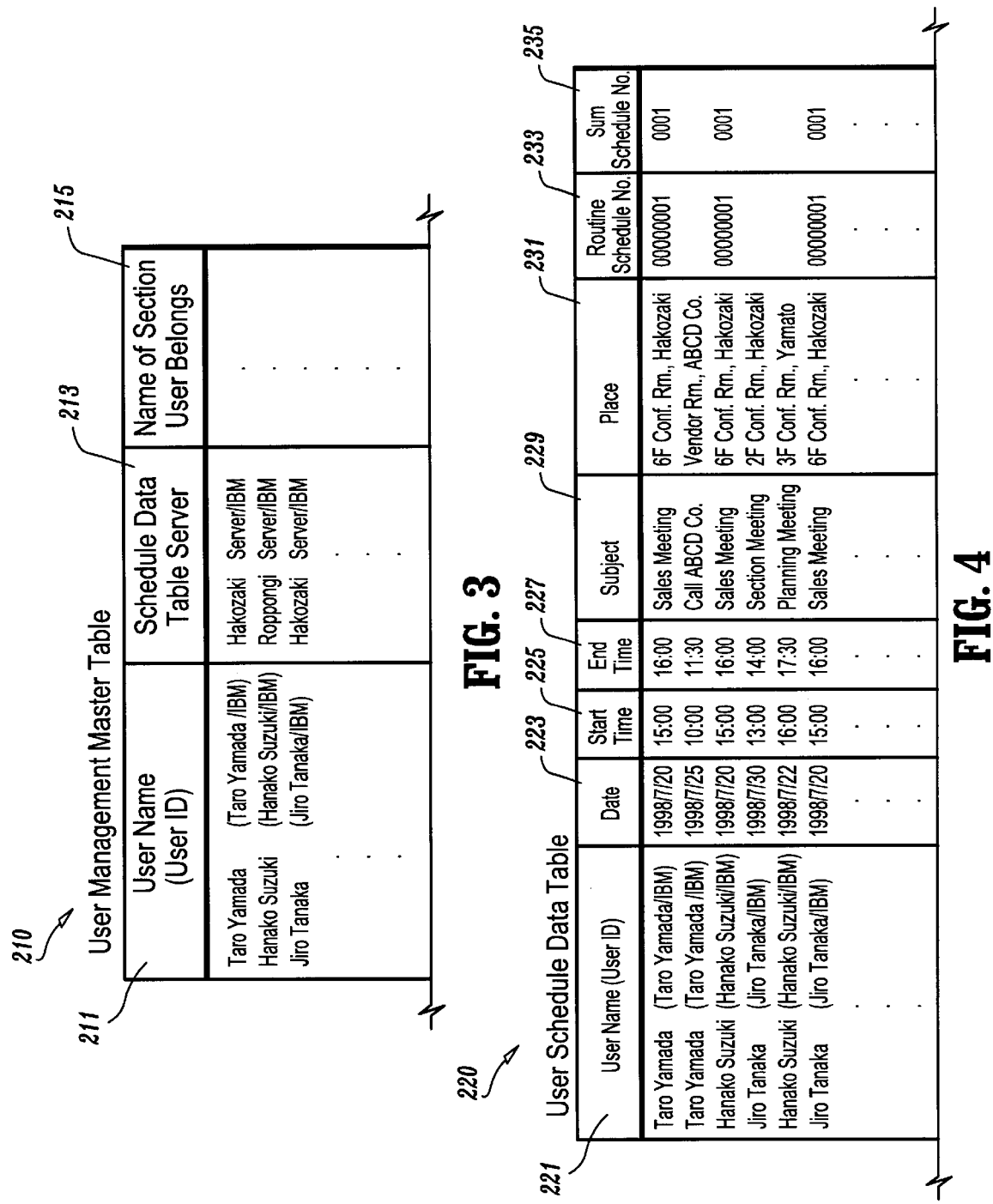
FIG. 3 is a schematic chart of the user management master table in the preferred embodiment of this invention.
FIG. 4 is a schematic chart of the user schedule data table in the preferred embodiment of this invention.

FIG. 3 is a schematic chart of the user management master table in the preferred embodiment of this invention. As shown in FIG. 3, a user name (user ID) 211, a schedule data table server 213, the name of section the user belongs and other user information are managed in the user management master table 210 in the preferred embodiment of this invention. The schedule data table server 213 is address information specifying a server which stores a schedule data table of each user. A code of the section to which each user belongs is managed in the name of section user belongs 215.

The user schedule management tables 121, 131 are tables for managing schedule information of each user. FIG. 4 is a schematic chart of the user schedule data table in the preferred embodiment of this invention. As shown in FIG. 4, a user name (user ID) 221, the date 223, the starting time 225, the ending time 227, the subject 229, the place 231, the routine schedule number 233, the sum schedule number 235 are managed in the user schedule data table 220 in the preferred embodiment of this invention. The date, the starting time and the ending time in which the schedule occurs are stored in the date 223, the starting time 225 and the ending time 227, respectively. Information of the subject and the place of the schedule is also stored in the subject 229 and the place 231. The routine schedule number 233 is information for determining whether or not the schedule is managed as a routine schedule. The sum schedule number 235 is also information for determining the sum schedule by which the schedule is managed.

The sum schedule management tables 123, 133 are tables for managing a sum schedule number which is managed in each routine schedule and are registered in a server of a member of interest. FIG. 5 is a schematic chart of the sum schedule management table in the preferred embodiment of this invention. As shown in FIG. 5, information of a schedule number 241 and a corresponding routine schedule number 243 is managed in the sum schedule management table 240 in the preferred embodiment of this invention.

The holiday management tables 127, 137 are tables for specifying days which are treated as a holiday. The holiday management tables 127, 137 are registered in all servers existing in the schedule management system in the preferred embodiment of this invention. FIG. 6 is a schematic chart of the holiday management table in the preferred embodiment of this invention. As shown in FIG. 6, information of dates of national holidays (month/day or year/month/day) 251, the name of the national holiday 253, dates of company holiday (month/day or year/month/day) 255 and the name of the company holiday 257 is managed in the holiday management table 250 in the preferred embodiment of this invention.

The routine management tables 124, 134 are tables for specifying members of interest of each routine schedule and registered in the sever of the member of interest. FIG. 7 is a schematic chart of the routine management table in the preferred embodiment of this invention. As shown in FIG. 7, information of the user name (user ID) 263 corresponding to the routine number 261 is managed in the routine management table 260 in the preferred embodiment of this invention.

This user list shows for whom a same routine schedule (one which has a same routine number) is registered. A same schedule can be located by a routine number and a sum number in a change and a deletion but it can not be found to whom the same schedule may be added in adding a schedule so that it is obtained from the user list.

Figure 2:
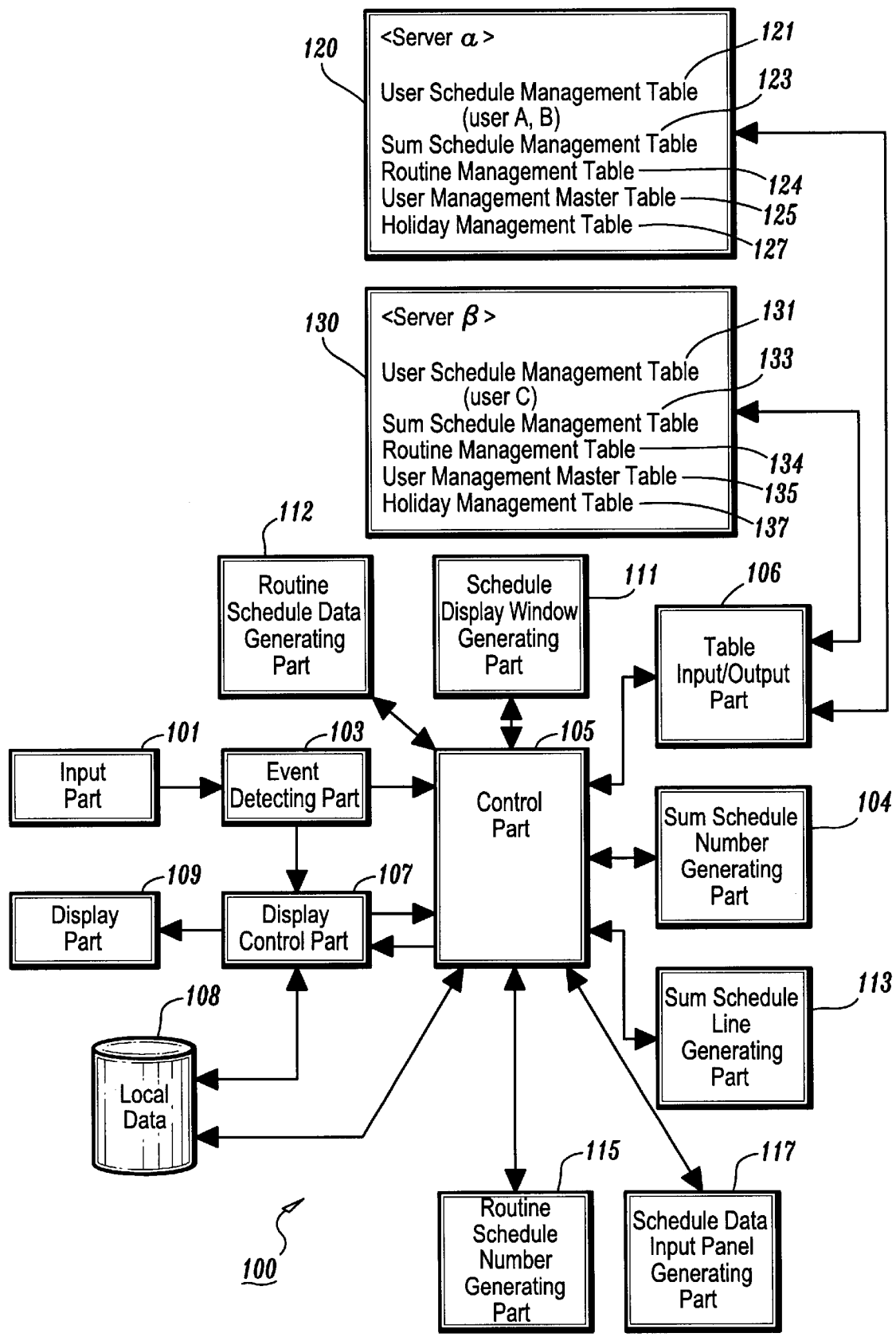
FIG. 2 is a block diagram of components.

While functional blocks shown in FIG. 2 have been described in the above, they are logical functional blocks and it is not meant that each of them is implemented by an independent hardware or software. It should be understood that they can be implemented by a compound or common hardware or software.

Schedule Input

Figure 8:
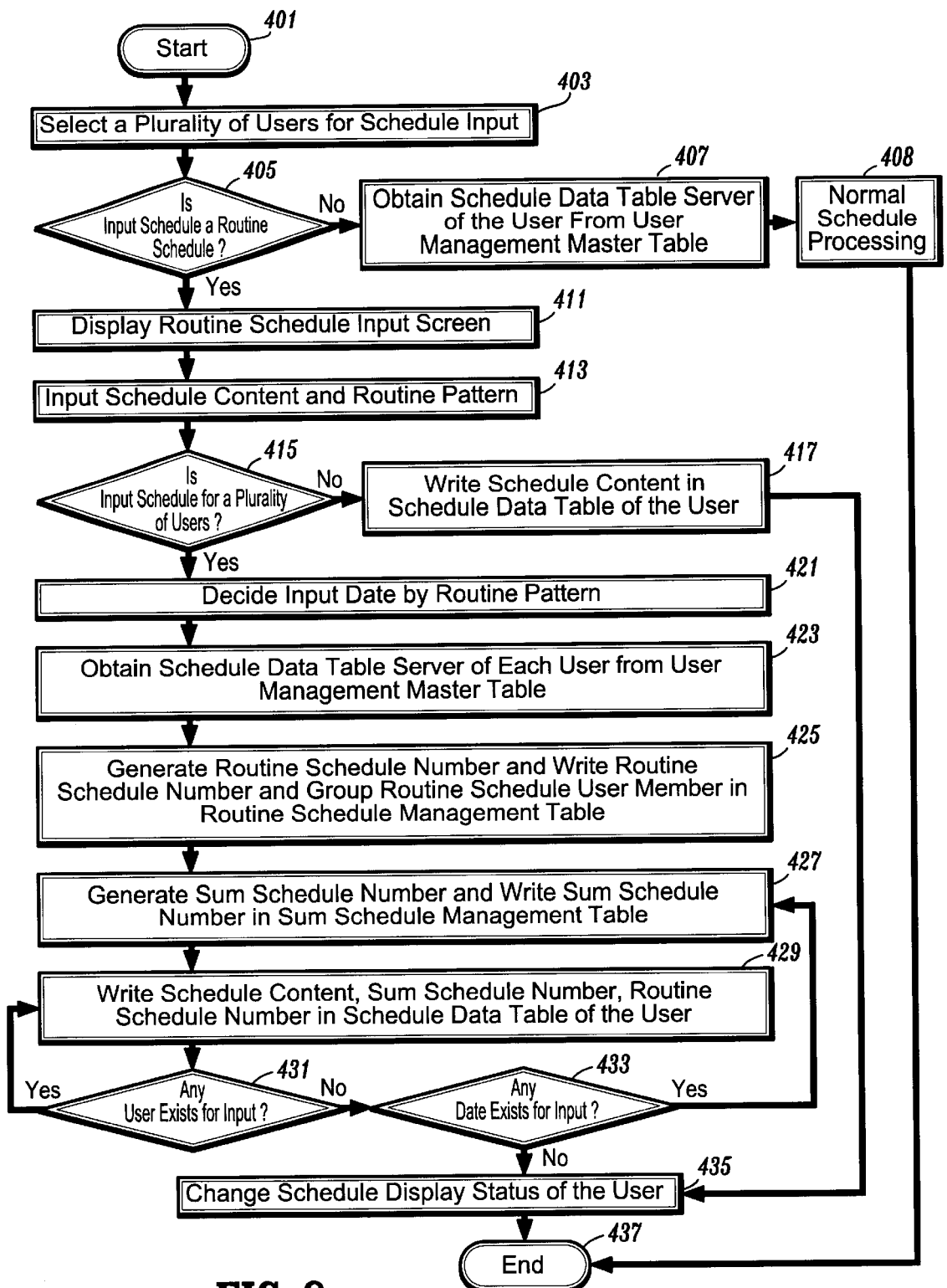
FIG. 8 is a flow chart showing a schedule input procedure of this invention.
Figure 13:
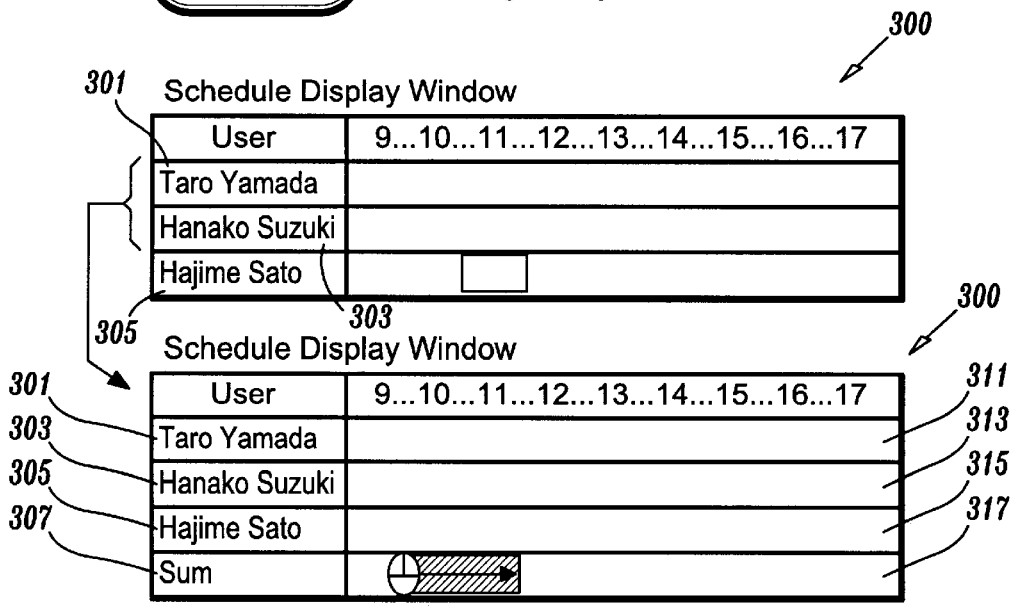
FIG. 13 is a chart showing a schedule display window in the preferred embodiment of this invention.

FIG. 8 is a flow chart showing a schedule input procedure in the preferred embodiment of this invention. As shown in FIG. 13, when a user for whom a schedule is to be inputted is selected and an icon instructing a schedule input is clicked by an operator, the schedule input procedure in the preferred embodiment of this invention is started (blocks 401, 403).

When the procedure is started, the control part 105 obtains a user name (user ID) and a specific reference date of the schedule of the user and instructs the sum schedule line generating part 113 to generate a sum line 317 in which schedule lines of the specific date of a plurality of users are summed up as shown in FIG. 13. The display control part 107 delivers a reflection of the information generated by the sum schedule line generating part 113 to the display part 109. The sum line 317 is thus displayed on the display screen.

Incidentally, when it is determined that an additional operation (for example, a member other than the member specified in the sum line is dragged and dropped) is effected by a user, the control part 105 obtains the name of the user and instructs the sum schedule line generating part 113 to regenerate the sum line 317.

When an input of a schedule content is effected by an operator, it is determined whether or not the schedule inputted is for a plurality of users by determining whether a mouse is dragged on the sum line 317 or the user schedule lines 311, 313 of the schedule display window 300.

Figure 14:
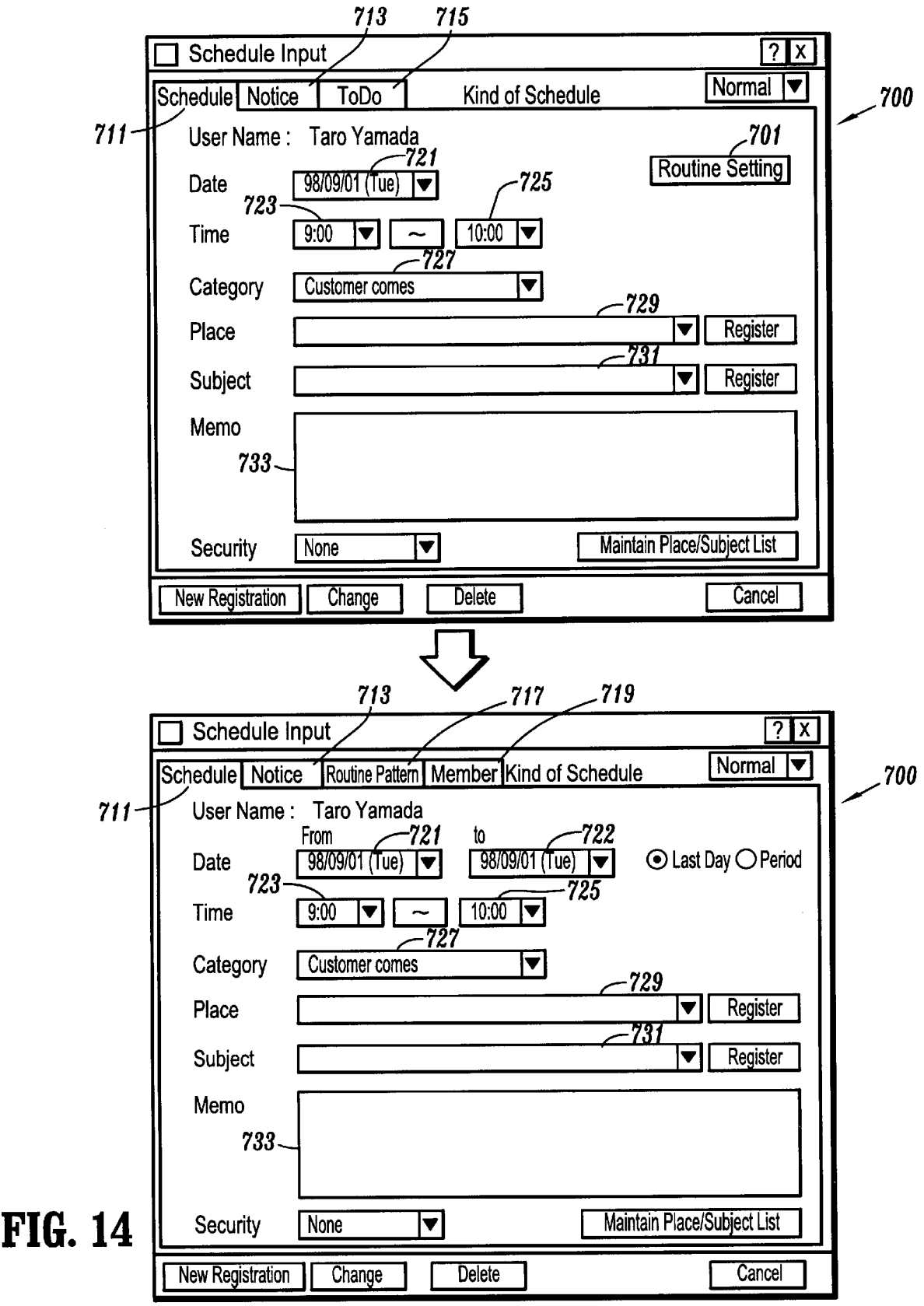
FIG. 14 is a chart showing a schedule data input panel in the preferred embodiment of this invention.

When the mouse is dragged on the sum line 317 or the user schedule lines 311, 313 of the schedule display window 300, the control part 105 instructs the sum schedule line generating part 113 and the schedule display window generating part 111 to generate a schedule bar and instructs the schedule data input panel generating part 117 to generate schedule data input panel as shown in FIG. 14. The schedule data input panel 700 of the preferred embodiment of this invention is provided with a member tag 719 to enable a member to whom a schedule is inputted to be referred to and added/deleted.

When the schedule to be inputted is for a plurality of users, the table input/output part 106 obtains an address of the schedule data table server of each user from the user management master table 210 (block 421). While the table input/output part 106 obtains an address of the schedule data table server of each user from the user management master table 210 after the operator has registered schedule information in this example, the address of the schedule data table server of each user may be obtained from the user management master table 210 at the time when the schedule display window shown in FIG. 13 is generated and saved in the local data storage part 108 (FIG. 2).

The display control part 107 delivers a reflection of information generated by the schedule data input panel generating part 117 to the display part 109. The schedule data panel 700 is thus displayed on the display screen as shown in FIG. 14. When an icon 701 which instructs to input routine schedule data is clicked in inputting a schedule, the schedule data input panel generating part 117 switches the content of the schedule data input panel to the content for inputting a routine schedule (blocks 405, 411, 413).

When schedule data is inputted without the icon 701 which instructs to input routine schedule data being clicked, the control part 105 obtains the schedule data table server of the user of interest from the user management master table via the table input/output part 106 (block 407) and registers it in that server as a normal schedule (block 408).

When an icon 701 which instructs to input routine schedule data is clicked, the display control part 107 delivers a reflection of information switched by the schedule data input panel generating part 117 to the display part 109. The panel for inputting routine schedule data is thus displayed on the display screen (block 411).

As shown in FIG. 14, the routine schedule data input panel 700 has entries of a routine period starting date 721, a routine period ending date 722, a starting time 723, an ending time 725 and other items 729–733. Also, a routine condition can be set up by clicking the routine pattern input tag 717.

Figure 15:
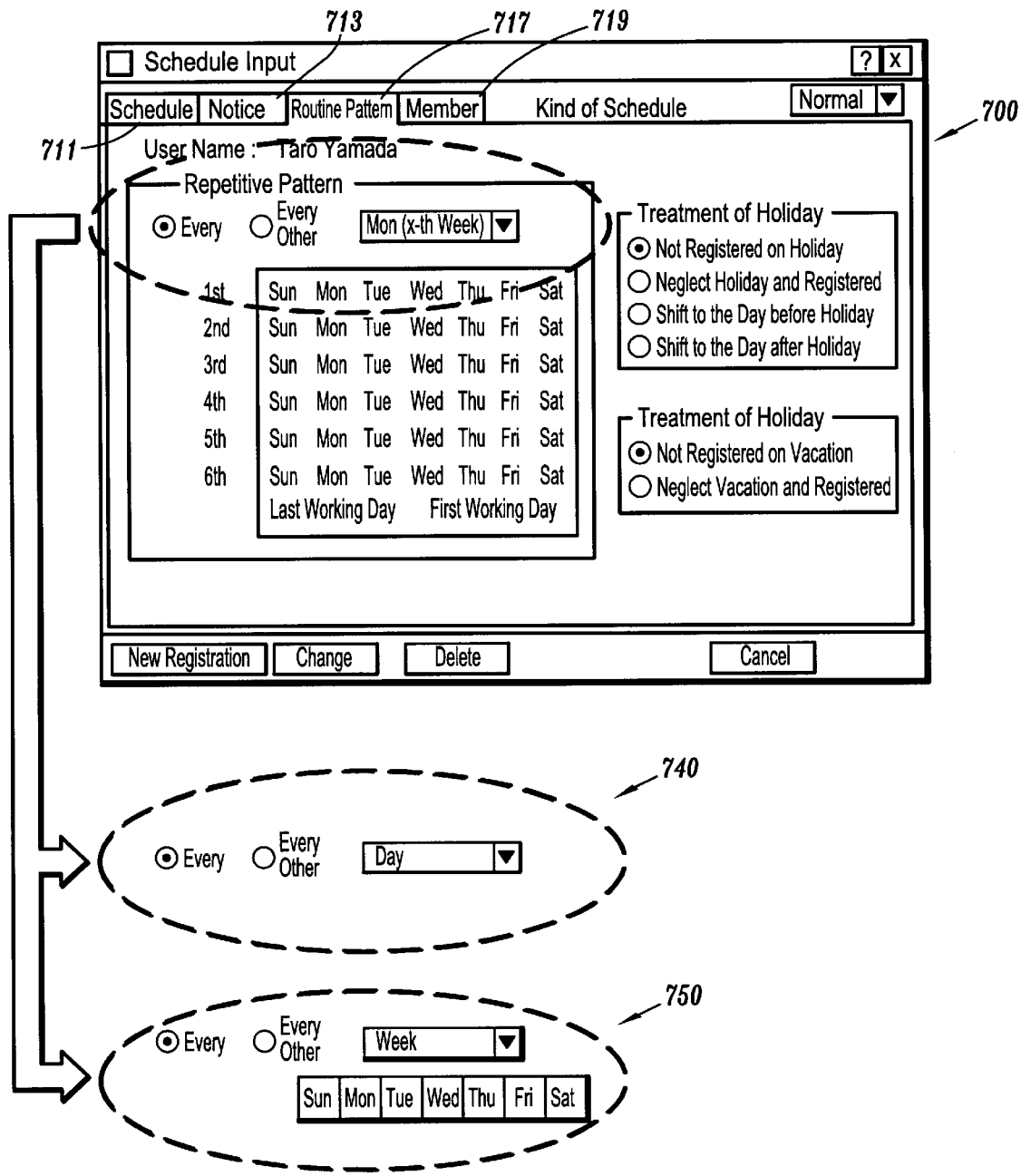
FIG. 15 is a chart showing a schedule data input panel in the preferred embodiment of this invention.

FIG. 15 is a diagram showing the panel for inputting a routine condition in the preferred embodiment of this invention. As shown in FIG. 15, 2 kinds of conditions, a basic condition such as every day, every other day (or every n+1 days), every second Wednesday of a month (or every m–th particular week day of a month), and an exceptional condition such as "a holiday is not registered" and "a registration on a holiday is shifted up to the previous day" can be set up as a routine condition. It is also possible to set up a schedule on certain week days of the 1st to the 6th weeks.

When input data is inputted and a registration icon is clicked by an operator (block 413), the routine schedule data generating part 112 obtains information of holidays related to the output of the routine schedule from the holiday management table 230 using information of the routine period 217 and the routine condition 219 and calculates the date on which the routine schedule is outputted (block 421).

For example, when the routine period is from 1998/09/01 to 1998/09/17, the routine basic condition is every other day and the routine exceptional condition is "excluding Sunday, national holiday, and the 2nd and the 4th Saturdays", a date matching the basic condition is calculated by the following equation.

$$D = SDD + 2(n-1) \quad (D \leq FDD)$$

where;

SDD is an integer which is the starting date of the period converted to the number of days from a specific reference date and FDD is an integer which is the ending date of the period converted to the number of days from a specific reference date (in the case of every x+1 days, this is calculated by D=SDD+(x+1)*(n−1) (where D≦FDD)).

In this example, the dates matching the basic condition are;

September 01, 03, 05, 07, 09, 11, 13, 15, and 17, 1998.

The dates matching the exceptional condition during the routine period are;

Sunday: September 06 and 13

The 2nd Saturday; September 12

National Holiday; September 15.

By excluding the dates matching the exceptional condition from the dates matching the basic condition, September 01, 03, 05, 07, 09, 11 and 17 are derived.

When the dates outputted as a routine schedule have been calculated, the table input/output part 106 obtains an address of the schedule data table server of the user of interest from the user management master table 210 (block 423). A routine schedule number is then generated by the routine schedule number generating part 115. The routine schedule number is generated as a number which can be uniquely identified in the system. The routine number and the ID of the group routine schedule user member are written in the routine management table 260 (block 425).

On the other hand, the control part 105 causes the sum schedule number generating part 104 to generate a sum schedule number 241 which can be uniquely identified in a same routine schedule for each of the outputted dates. FIG. 16 is a schematic chart showing how the routine number and the sum number are allocated for each of the users and the routine dates. As shown in FIG. 16, one item of routine management data (one for all users rather than for each user) is generated in the user schedule data inputted as a group routine schedule and the user who is the member is registered. Sum management data is also generated for each date (one for all users of interest) and different sum numbers are allocated to different units of sum management data.

The control part 105 then causes the table input/output part 106 to write the sum schedule number and the corresponding routine schedule number in the sum schedule management table 240 (block 427). In addition, the control part 105 causes the table input/output part 106 to access the schedule data table server of each user using the address of the schedule data table server of each user obtained in the block 423 and write a routine schedule number 233, a sum schedule number 235, a schedule content (date 223, starting/ending times 225, 227, subject 229, place 231, etc.) in the schedule data table of the users of interest (blocks 427, 429, 431. 433).

The schedule display window 300 is then regenerated for changing the schedule display status of the users of interest (block 435). In the preferred embodiment of this invention, the display control part 107 sets the display attribute of the schedule data including a routine number and a sum number to one which is different from other schedule (attributes of color, mesh, underscore, etc.) so that it is instantly recognized as a sum schedule.

Change of Schedule

Figure 9:
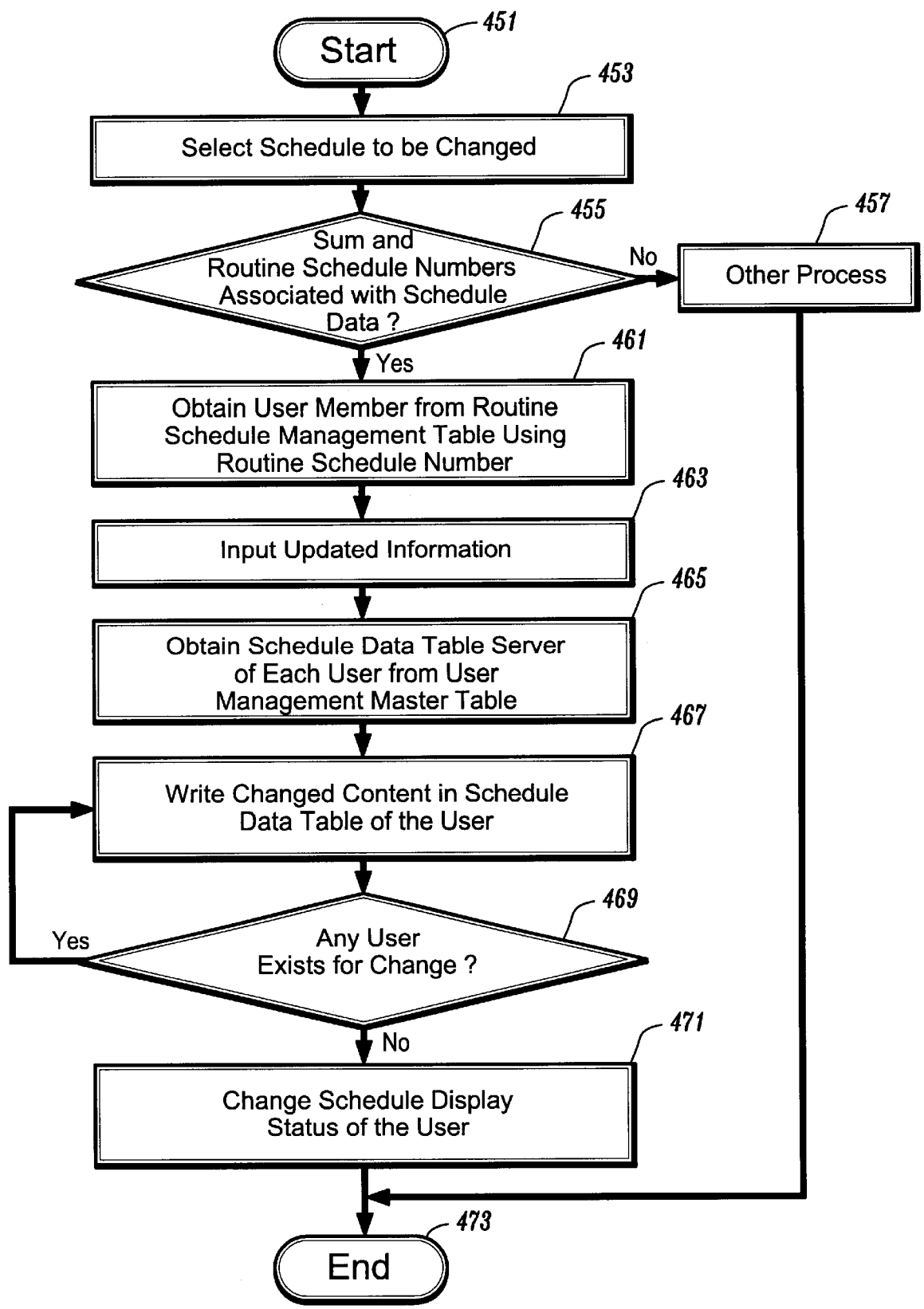
FIG. 9 is a flow chart showing a procedure of changing one of group routine schedule of this invention.

FIG. 9 is a flow chart showing a procedure of changing one of group routine schedule in the preferred embodiment of this invention. When a schedule to be changed is selected by a double clicking operation and the content of the schedule is changed by an operator, the event detecting part 103 detects this and the procedure is started (blocks 451, 453).

When the procedure is started, the control part 105 accesses to the local data storage part 108 to determine whether or not a sum schedule number and a routine schedule number are associated with the schedule to be changed (block 453). When neither a sum schedule number nor a routine schedule number is associated with the schedule to be changed, the control part 105 accesses to the user management master table 210 to obtain the address of the schedule data table server of the user of the schedule to be changed. The control part 105 then accesses to the schedule data table 220 of that user to write the change of the content of the schedule (change the date 223, the starting time 225, the ending time 227, the subject 229 or place 231) (block 457).

Even when only a routine schedule number is associated, the control part 105 accesses to the user management master table 210 to obtain the address 213 of the schedule data table server of the user whose schedule is to be changed. The control part 105 accesses to the schedule data table 220 of that user using the address information 213 to write the content of the schedule to be changed (change the date 223, the starting time 225, the ending time 227, the subject 229 or the place 231) (block 457). When only the sum schedule number is associated, the above process is applied to the user who are managed in the sum schedule management table (block 457).

When both the sum schedule number and the routine schedule number are associated with the schedule to be changed, the control part 105 accesses to the routine schedule management table 260 based on the routine schedule number to obtain a user list 263 which has that routine schedule number 261 (block 463).

When the operator instructs to update after inputting the content of the change, the address 213 of the schedule data table server of the user of interest (the user having a same routine number) is obtained from the user management master table 210 (block 465). The schedule data tables 220 of the all users are accessed based on the address information 213 to write the content of the change of the schedule for schedule data having a combination of a same routine schedule number and a same sum schedule number (blocks 467, 469). In this case, if the operator effects a operation to instruct deletion rather than update, the schedule data having a combination of a same routine schedule number and a same sum schedule number is deleted. When such schedule change has been done, the schedule display window 300 is regenerated to change the schedule display status of the user of interest (block 471).

FIG. 17 is a schematic chart showing the change of the user schedule data when a schedule is changed for said one of the group routine schedules. As shown in FIG. 17, when the schedule of Taro Yamada who has a routine number 0000001 and a sum number 0003 is changed or deleted, the schedules of Hanako Suzuki and Jiro Sato having the same routine and sum numbers as Taro Yamada are correspondingly changed or deleted.

Figure 10:
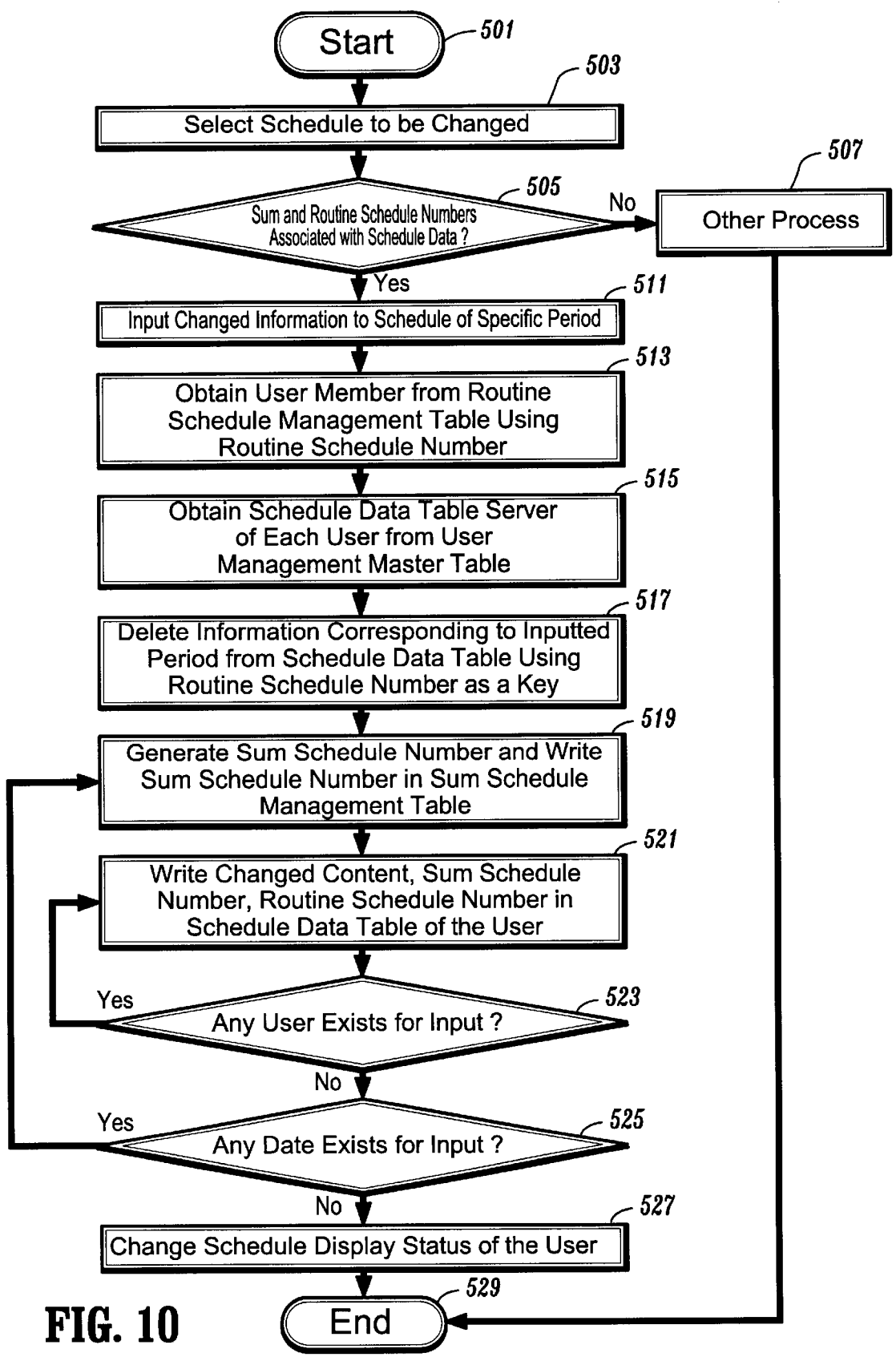
FIG. 10 is a flow chart showing the procedure of changing a plurality of routine schedules (for a given period) of this invention.

FIG. 10 is a flow chart showing the procedure of changing a plurality of routine schedules (for a given period) in the preferred embodiment of this invention. When a schedule to be changed is selected by an operator, the procedure is started (blocks 501, 503). It is first determined whether or not a routine schedule number and a sum schedule number are associated therewith (block 505). If neither number is associated, the operation diverts to other process (block 507). When both a routine schedule number and a sum schedule number are associated therewith, an input panel for changing the routine schedule is displayed. When the operator changes the content of the schedule and clicks an OK button in the input panel, the event detecting part 103 detects this (block 511).

Figure 18:
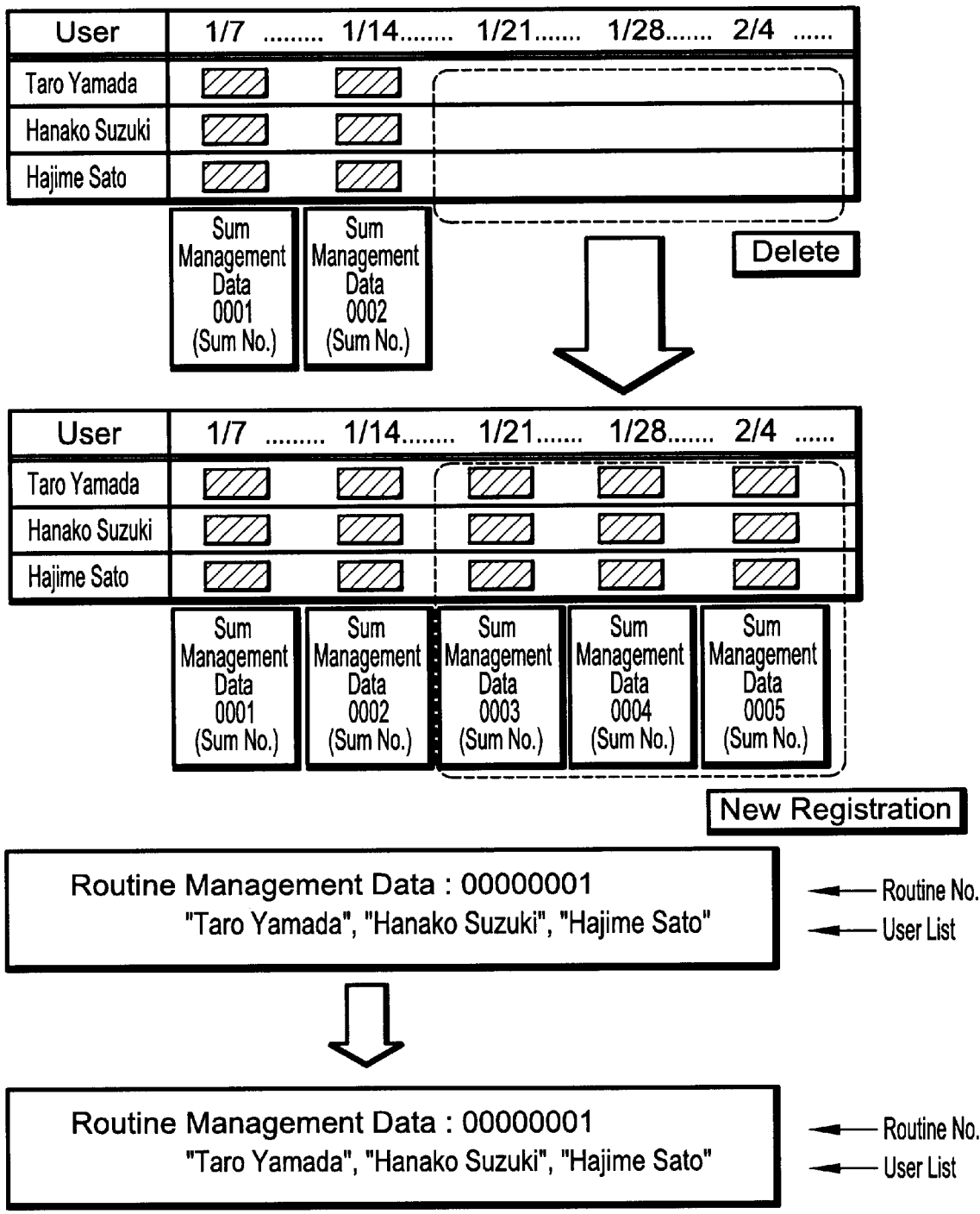
FIG. 18 is a schematic chart of the user schedule data table in changing/deleting and copying a group routine schedule in the preferred embodiment of this invention.
Figure 19:
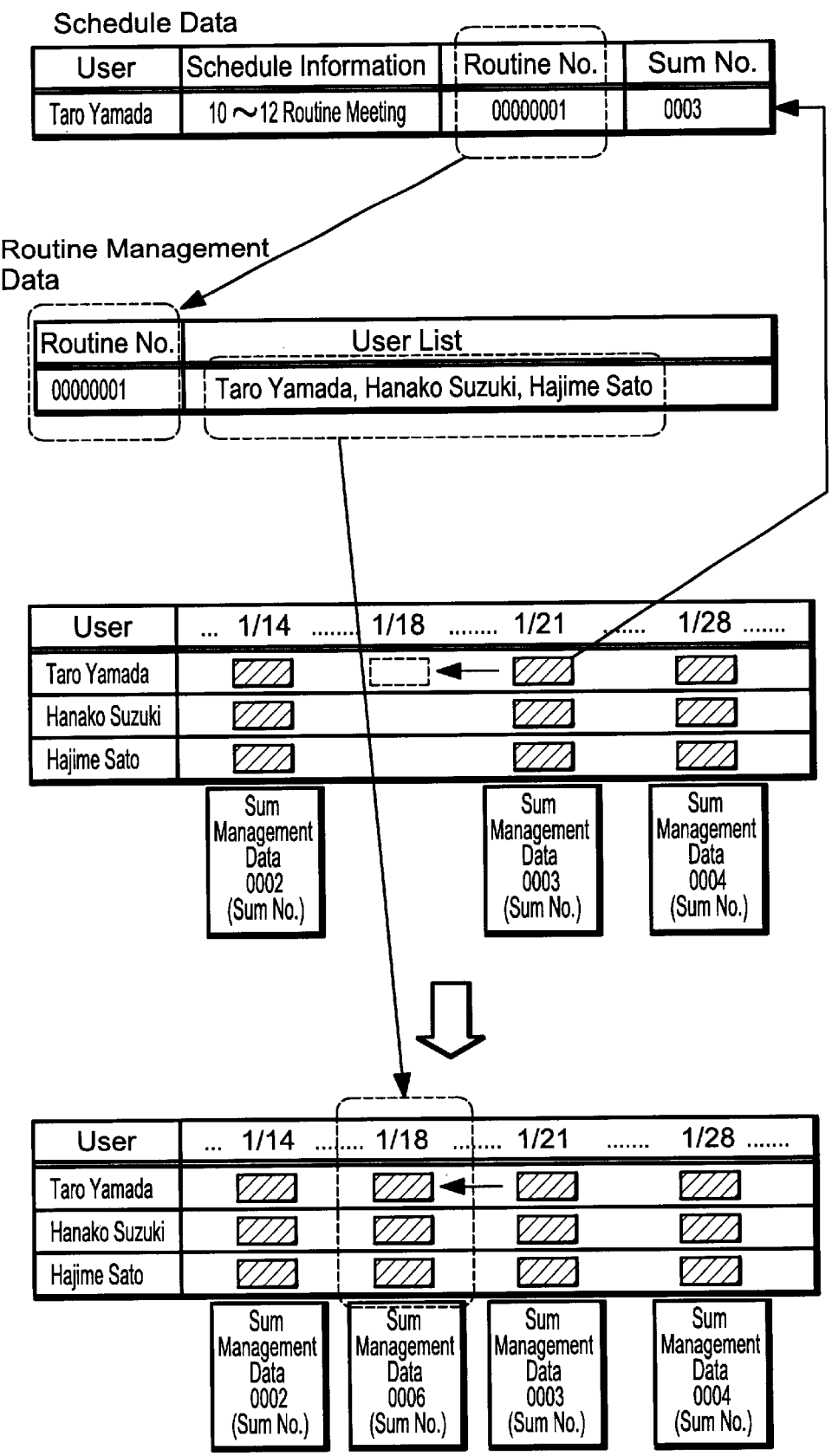
FIG. 19 is a schematic chart of the user schedule data table in copying a group routine schedule in the preferred embodiment of this invention.

All existing routine schedule data items having the same routine schedule number as the schedule selected by the operator are then extracted (block 513). The extracted schedule data are deleted (block 517). Information of holidays related to the output of the routine schedule is then obtained from the holiday management table 230 based on the information of the routine period 217 and the routine condition 219 in the manner similar to the procedure of "C-1. Schedule Input", the date for which the routine schedule is outputted is calculated and a sum number is generated for each date (block 519). In this case, the sum number generating part 104 refers to the information of the sum schedule management table to generate a sum number which is not currently allocated as shown in FIG. 18.

The generated sum number is stored in the sum schedule management table (block 519). When the date which is outputted as a routine schedule is calculated, changed data and a newly generated sum number are written in the schedule data table 250 with the current routine schedule number as the routine schedule number (block 521).

When the data of the schedule data table 250 has been changed, the schedule display window 300 is regenerated to change the schedule display status (block 527). Because a same routine number as the number before the schedule was changed is allocated even if a part or all of the routine schedule is changed, the schedule can be changed or deleted in a bundle or changed partly even after the change has been processed. When the operator effected an operation to instruct a deletion rather than a change, the process of the blocks 519 to 525 is not effected.

Copying Schedule

Figure 11:
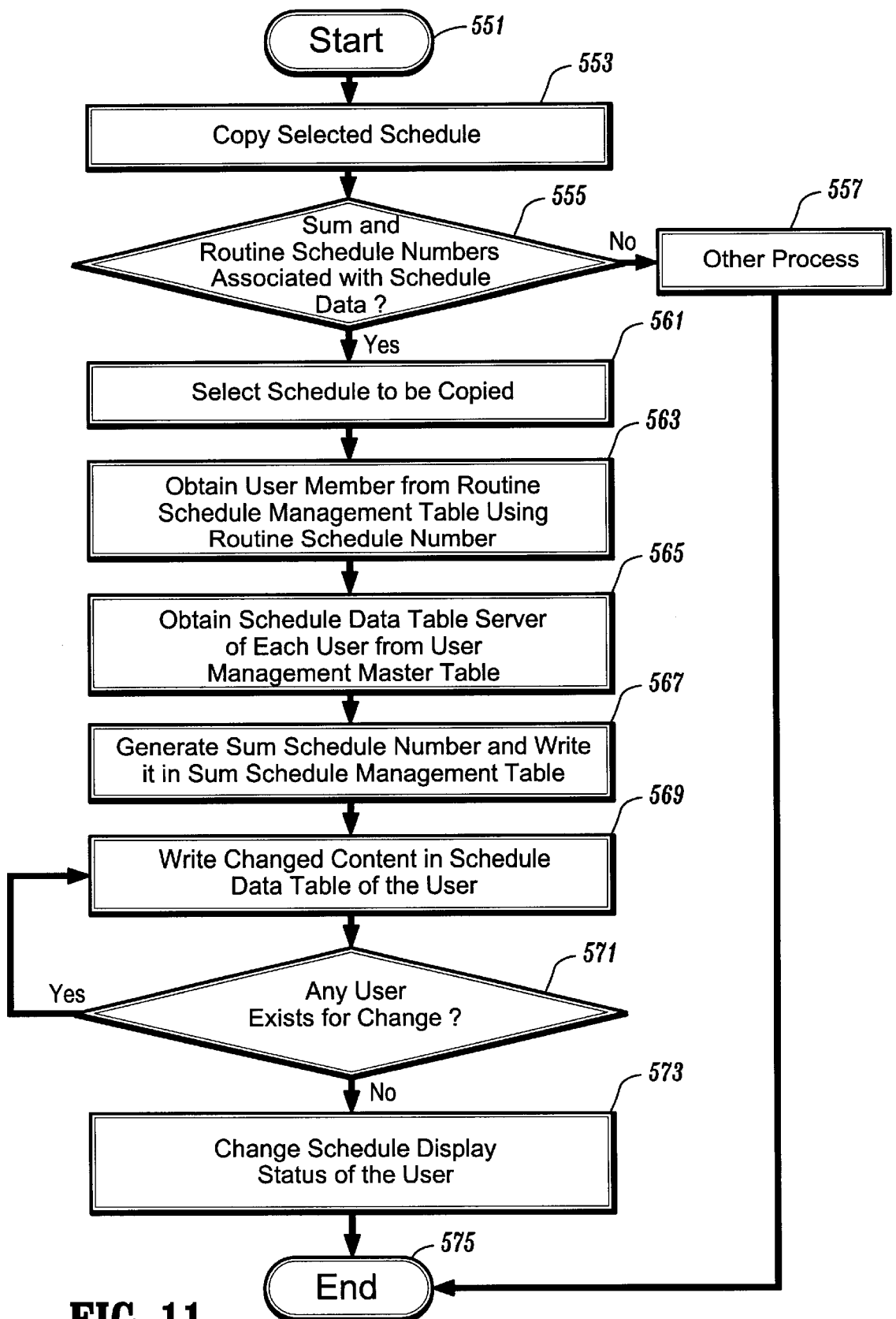
FIG. 11 is a flow chart showing an example of a procedure of copying a group routine schedules of this invention.

FIG. 11 is a flow chart showing a procedure of copying a schedule to one of group routine schedules in the preferred embodiment of this invention. When a schedule to be copied is dragged and dropped to another date, the event detecting part 103 detects this and the procedure is started (blocks 551, 553).

When the procedure is started, the control part 105 accesses to the local data storage part 108 to determine whether or not a sum schedule number and a routine schedule number are associated with the schedule to be copied (block 555). When neither a sum schedule number nor a routine schedule number is associated with the schedule to be copied, the control part 105 accesses to the user management master table 210 to obtain the address 213 of the schedule data table server of the user of the schedule to be copied. The control part 105 accesses to the schedule data table 220 of that user using the address information 213 to write the content of the schedule (add the date 223, the starting time 225, the ending time 227, the subject 229 or the place 231) (block 557).

Even when only a routine schedule number is associated, the user management master table 210 is accessed to obtain the address 213 of the schedule data table server of the user of the schedule to be copied. The control part 105 accesses to the schedule data table 220 of that user using the address information 213 to write the content of the schedule (add the date 223, the starting time 225, the ending time 227, the subject 229 or the place 231) (block 557). When only a sum schedule number is associated, the above process is effected to the user who is managed in the sum schedule management table (block 557).

When both a sum schedule number and a routine schedule number are associated with the schedule to be copied, the routine schedule management table 260 is accessed based on the routine schedule number to obtain a user list 263 of this routine schedule number 261 (block 563).

The user management master table 210 is then accessed to obtain the address 213 of the schedule data table servers of all users (block 563). The schedule data tables 220 of all users are accessed based on the address information 213 to write the contents of the schedule and sum numbers (blocks 567, 569). The sum number is generated in correspondence to the date to be copied in the manner similar to the case of the schedule input and the sum number generating part 104 refers to the information of the sum schedule management table to generate a sum number which is not currently allocated. When the schedule is so changed, the schedule display window 300 is regenerated to change the schedule display status to the user of interest (block 573).

Display Schedule

Figure 12:
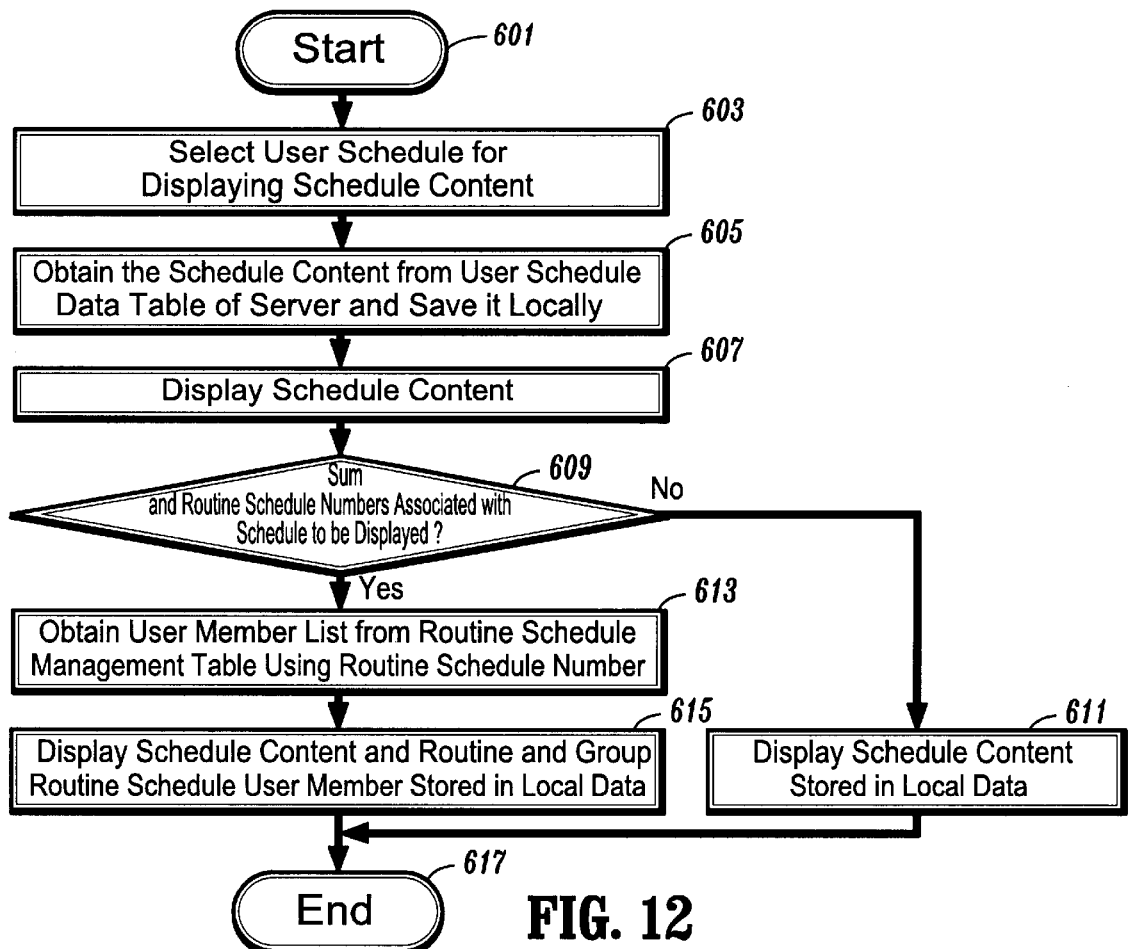
FIG. 12 is a flow chart showing an example of a procedure of displaying schedule data of this invention.

FIG. 12 is a flow chart showing the schedule display procedure in the preferred embodiment of this invention. When an operator selects a schedule to be displayed and instructs to display the content of the schedule, the event detecting part 103 detects this and the procedure is started (blocks 601, 603).

The control part 105 accesses to the user schedule data management table 250 via the table input/output part 106 to obtain the schedule data of interest and save it in the local data storage part 108 (block 605). The local data storage part 108 is then accessed to determine whether or not a routine schedule number and a sum schedule number are associated with the schedule to be changed (block 609). When a routine schedule number and a sum schedule number are not associated with the schedule to be changed, the schedule which is stored in the local data storage part 108 as a normal schedule is displayed in a normal manner (block 613). When a routine schedule number and a sum schedule number are associated with the schedule to be changed, the schedule is displayed in a manner different from a normal schedule so that it may be recognized as a group routine schedule (block 611).

As described in the above, this invention can flexibly cope with a routine schedule in which a change or deletion of the schedule of entire group or a part thereof occurs without forcing a cumbersome operation to the operator.

What is claimed is:

1. A computerized method of managing individual schedules for each of a plurality of members of a user group, the method comprising:

detecting with a first computer a request to schedule a recurring sub-group event;

obtaining with the first computer user identification information that uniquely identifies each member of a sub-group of said user group;

providing with the first computer an event input area for receiving event information substantially common to said sub-group members in response to said detected request;

receiving with the first computer recurring sub-group event preferences into said event input area comprising at least one of a preferred starting time, a preferred ending time, a preferred duration and a condition on the dates that said recurring sub-group event is to be set;

assigning with at least one of the first computer and a second computer a sub-group event identifier corresponding to said obtained sub-group member identification information and to said recurring sub-group event preferences;

correlating with at least one of the first computer and the second computer said individual schedules of the sub-group members with said recurring sub-group event preferences;

generating with at least one of the first computer and the second computer at least one set of event option data responsive to said sub-group event identifier and said correlated individual schedules, the event option data comprising an event starting time and an event ending time for each of a plurality of set dates responsive to said condition on the dates that said recurring sub-group event is to be set wherein said times need not be the same for each set date;

selecting with at least one of the first computer and the second computer one of the at least one set of event option data for linking said sub-group event identifier to the selected set of event option data;

updating with at least one of the first computer and the second computer a plurality of sum schedules that each correspond to one of the dates of the selected event option data;

registering with at least one of the first computer and the second computer said individual schedules of the sub-group members in correlation with said sub-group event identifier;

maintaining with at least one of the first computer and the second computer the registered individual schedules of all user group members in correspondence with all sub-group event identifiers.

2. A method as defined in claim 1, further comprising:

displaying a plurality of event information items wherein each of said event information items comprises at least one of an event starting time, an event ending time, an event period, an event content and a sub-group member list;

detecting that one of said plurality of event information items is selected;

recalling a sub-group event identifier associated with said selected event information item;

receiving a change to said selected event information item; and reregistering said individual schedule data for each sub-group member in correlation with said change to said selected event information item.

3. A method as defined in claim 1 wherein said plurality of set dates comprise dates occurring on a periodic schedule.

4. A method as defined in claim 1 wherein said user group comprises a plurality of overlapping sub-groups.

5. A method as defined in claim 1 wherein any member of said user group may request to schedule a sub-group event.

6. A method as defined in claim 1 wherein said sub-group comprises members selected from any sub-set of said user group.

7. A method as defined in claim 1 wherein any member of said sub-group may request to schedule a sub-group event.

8. A method as defined in claim 1 wherein the received event preferences further comprise a condition that at least one of an alternate subset of sub-group members have an individual schedule associated with said requested sub-group event, and correlating comprises assuring that the at least one of said alternate subset of sub-group members has a corresponding individual schedule compatible with said recurring sub-group event preferences.

9. A method as defined in claim 1 further comprising:

displaying said provided event input area; and displaying at least one of said maintained individual schedules of said user group members.

10. A method as defined in claim 8, further comprising:

displaying a plurality of event information items wherein each of said event information items comprises at least one of an event date, an event starting time, an event ending time, an event period, an event content and a sub-group member list;

detecting that one of said plurality of event information items is selected;

determining a sub-group event identifier associated with said selected event information item wherein at least one of said event starting time and said event ending time need not be the same for each event date associated with said sub-group event identifier;

receiving a change to said selected event information item; and reregistering said individual schedule data for each sub-group member corresponding to the sub-group event identifier in correlation with said change to said selected event information item.

11. A schedule management system for managing individual schedule information for each of a plurality of users comprising a user group, said system comprising:

a display part having an event input area for prompting for recurring sub-group event preference information;

an input part in signal communication with said display part;

a detector part in signal communication with said input part for detecting a request to schedule a sub-group of said user group for an event;

a receiver part in signal communication with said input part for receiving a user input responsive to said event input area, said user input comprising recurring sub-group event information substantially common to members of said sub-group;

a sub-group event identifier part in signal communication with said detector and said receiver parts for uniquely identifying each recurring sub-group event preference and each member of said sub-group;

a schedule generator part responsive to said recurring sub-group event identifier and said receiver for generating schedule data comprising the event starting time and the event ending time for each of a plurality of set dates corresponding to said condition on the date wherein at least one of the times need not be the same for each set date associated with said sub-group event identifier;

a schedule identifier responsive to said schedule generator for identifying a schedule corresponding to each of said plurality of set dates; and a schedule management table for correlating said generated schedule data of said sub-group members and registering said generated schedule data in correlation with said set dates and said recurring sub-group event identifier.

12. A schedule management system as defined in claim 11 wherein said display part is configured to provide a plurality of individual schedule information items comprising a schedule starting time and a schedule ending time.

13. A schedule management system as defined in claim 11 wherein said input part is configured to provide a schedule data input panel for obtaining information of a changed period and a changed content.

14. A schedule management system as defined in claim 11, further comprising a control part for reregistering said sub-group event identifier and said individual schedules associated therewith when said sub-group event identifier and said individual schedules are associated with changed schedule data.

15. A storage medium embodying a schedule management program for managing individual schedules for each of a plurality of members of a user group, said schedule management program comprising:

program code for detecting a request to schedule a recurring sub-group event;

program code for obtaining user identification information that uniquely identifies each member of a sub-group of said user group;

program code for providing an event input area for receiving event information substantially common to said sub-group members in response to said detected request;

program code for receiving recurring sub-group event preferences into said event input area comprising at least one of a preferred starting time, a preferred ending time, a preferred duration and a condition on the dates that said recurring sub-group event is to be set;

program code for assigning a sub-group event identifier corresponding to said obtained sub-group member identification information and to said recurring sub-group event preferences;

program code for correlating said individual schedules of the sub-group members with said recurring sub-group event preferences;

program code for generating at least one set of event option data responsive to said sub-group event identifier and said correlated individual schedules, the event option data comprising an event starting time and an event ending time for each of a plurality of set dates responsive to said condition on the dates that said recurring sub-group event is to be set wherein said times need not be the same for each set date;

program code for selecting one of the at least one set of event option data for linking said sub-group event identifier to the selected set of event option data;

program code for updating a plurality of sum schedules that each correspond to one of the dates of the selected event option data;

program code for registering said individual schedules of the sub-group members in correlation with said sub-group event identifier; and program code for maintaining the registered individual schedules of all user group members in correspondence with all sub-group event identifiers.

16. A storage medium as defined in claim 15, said schedule management program further comprising:

program code for displaying a plurality of event information items wherein each of said event information items comprises at least one of an event date, an event starting time, an event ending time, an event period, an event content and a sub-group member list;

program code for detecting that one of said plurality of event information items is selected;

program code for recalling a sub-group event identifier associated with said selected event information item;

program code for receiving a change to said selected event information item; and program code for reregistering said individual schedule data for each sub-group member corresponding to the sub-group event identifier in correlation with said change to said selected event information item.

17. A schedule management apparatus for managing individual schedules for each of a plurality of users comprising a user group, said apparatus comprising:

means for detecting a request to schedule a recurring sub-group event;

means for obtaining user identification information that uniquely identifies each member of a sub-group of said user group;

means for providing an event input area for receiving event information substantially common to said sub-group members in response to said detected request;

means for receiving recurring sub-group event preferences into said event input area comprising at least one of a preferred starting time, a preferred ending time, a preferred duration and a condition on the dates that said recurring sub-group event is to be set;

means for assigning a sub-group event identifier corresponding to said obtained sub-group member identification information and to said recurring sub-group event preferences;

means for correlating said individual schedules of the sub-group members with said recurring sub-group event preferences;

means for generating at least one set of event option data responsive to said sub-group event identifier and said correlated individual schedules, the event option data comprising an event starting time and an event ending time for each of a plurality of set dates responsive to said condition on the dates that said recurring sub-group event is to be set wherein said times need not be the same for each set date;

means for selecting one of the at least one set of event option data for linking said sub-group event identifier to the selected set of event option data;

means for updating a plurality of sum schedules that each correspond to one of the dates of the selected event option data;

means for registering said individual schedules of the sub-group members in correlation with said sub-group event identifier; and means for maintaining the registered individual schedules of all user group members in correspondence with all sub-group event identifiers.

18. A schedule management apparatus as defined in claim 17, further comprising:

means for displaying a plurality of event information items wherein each of said event information items comprises at least one of an event date, an event starting time, an event ending time, an event period, an event content and a sub group member list;

means for detecting that one of said plurality of event information items is selected;

means for recalling a sub-group event identifier associated with said selected event information item;

means for receiving a change to said selected event information item; and means for reregistering said individual schedule data for each sub-group member corresponding to the sub-group event identifier in correlation with said change to said selected event information item.

* * * * *

Disclaimer 6,594,637 — Tohru Furukawa, Hadano; Michikazu Hirota, Machida, all of Japan; Kenichi Nagashima, Machida. SCHEDULE MANAGEMENT SYSTEM AND METHOD. Patent dated July 15, 2003. Disclaimer filed Oct. 4, 2006, by the assignee, International Business Machines Corporation.

Hereby enters this disclaimer to all claims of said patent.

*(Official Gazette February 27, 2007)*